United States Patent
Duran et al.

(10) Patent No.: US 7,787,614 B2
(45) Date of Patent: Aug. 31, 2010

(54) SEALING CURRENT TERMINATOR FOR INHIBITING OXIDATION AND METHODS THEREFOR

(75) Inventors: Christian S. Duran, Ft. Worth, TX (US); Kathleen E. Blake, Keller, TX (US); Robert J. Bennett, Lewisville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 1359 days.

(21) Appl. No.: 11/247,924

(22) Filed: Oct. 11, 2005

(65) Prior Publication Data

US 2007/0116257 A1   May 24, 2007

(51) Int. Cl.
*H04M 1/76* (2006.01)
(52) U.S. Cl. .............. 379/413.02; 361/643; 361/728; 379/26.01; 379/27.01; 379/387.01; 379/412; 379/413.04; 439/49
(58) Field of Classification Search ............... 320/101; 370/401, 257; 379/93.05, 377, 387.01, 399.01, 379/413, 387, 1.04, 412, 26.01, 27.07, 413.02, 379/413.04; 361/643, 728; 439/49
See application file for complete search history.

(56) References Cited

U.S. PATENT DOCUMENTS

| | | | |
|---|---|---|---|
| 4,136,443 A | 1/1979 | Nabiullin et al. .............. 29/731 |
| 4,582,960 A * | 4/1986 | DeLuca et al. ............ 379/27.07 |
| 4,624,514 A * | 11/1986 | Smith .......................... 379/412 |
| 4,647,725 A * | 3/1987 | Dellinger et al. ......... 379/26.01 |
| 4,716,358 A | 12/1987 | Fucito ........................ 323/316 |
| 4,745,622 A | 5/1988 | Gupta .......................... 375/14 |
| 4,771,449 A * | 9/1988 | Kiko et al. ............... 379/93.05 |
| 4,910,770 A * | 3/1990 | Collins et al. .......... 379/413.02 |
| 4,919,544 A * | 4/1990 | Graham ................. 379/413.04 |
| 4,984,250 A | 1/1991 | Koyama ...................... 375/36 |
| 4,984,267 A | 1/1991 | Martinez .................... 379/413 |
| 5,131,033 A | 7/1992 | Reum ......................... 379/413 |
| 5,177,782 A * | 1/1993 | Henderson et al. .......... 379/412 |
| 5,216,704 A | 6/1993 | Williams et al. .............. 379/93 |
| 5,235,638 A * | 8/1993 | Dondero ................ 379/413.04 |
| 5,291,553 A | 3/1994 | Smith ......................... 379/399 |
| 5,369,548 A * | 11/1994 | Combs ....................... 361/643 |
| 5,442,697 A | 8/1995 | McGary et al. ............. 379/399 |
| 5,570,422 A * | 10/1996 | Napiorkowski et al. 379/413.02 |
| 5,600,717 A * | 2/1997 | Schneider et al. ....... 379/413.03 |
| 5,621,731 A * | 4/1997 | Dale et al. .................. 370/257 |

(Continued)

OTHER PUBLICATIONS

McCarty, D.; Sealing or Wetting Current; OSP Magazine Online (www.ospmag.com/issues/article); Aug. 2005; 3 pages, retrieved Sep. 8, 2005.

*Primary Examiner*—Gerald Gauthier
(74) *Attorney, Agent, or Firm*—C. Paul Lewallen

(57) ABSTRACT

Methodologies and structure are provided for use in a communications line that transmit data without plain old telephone service (POTS), or splits the POTS service from the data service, to inhibit oxidation of electrical connections within the physical communications line between the central office of a service provider and a subscriber premises and/or subscriber equipment. A direct current load is drawn by a sealing current terminator circuit that is electrically coupled across the communications line at a convenient location proximate or within the subscriber's location so as to assist in providing oxidation reducing direct current flow along a portion of the communications loop coupling the service provider with the subscriber.

25 Claims, 7 Drawing Sheets

U.S. PATENT DOCUMENTS

| | | | |
|---|---|---|---|
| 5,642,412 A | 6/1997 | Reymond | 379/348 |
| 5,901,220 A * | 5/1999 | Garver et al. | 379/399.01 |
| 5,903,041 A | 5/1999 | La Fleur et al. | 257/530 |
| 6,139,333 A * | 10/2000 | Green et al. | 439/49 |
| 6,178,080 B1 | 1/2001 | Wilken et al. | 361/119 |
| 6,272,209 B1 | 8/2001 | Bridger et al. | 379/27 |
| 6,343,114 B1 | 1/2002 | Chea, Jr. | 379/29.01 |
| 6,453,016 B1 | 9/2002 | Chea, Jr. | 379/29.01 |
| 6,500,020 B2 | 12/2002 | Vo et al. | 439/409 |
| 6,522,548 B1 * | 2/2003 | Duggan et al. | 361/728 |
| 6,560,129 B1 | 5/2003 | Walger | 363/50 |
| 6,618,482 B2 | 9/2003 | Parrott | 379/412 |
| 6,647,117 B1 | 11/2003 | Wallace et al. | 379/413 |
| 6,826,268 B2 | 11/2004 | Adams | 379/112.04 |
| 6,931,108 B2 | 8/2005 | Ludeman | 379/93.05 |
| 7,027,587 B2 * | 4/2006 | Menasco, Jr. | 379/377 |
| 7,515,691 B2 * | 4/2009 | Warner et al. | 379/1.04 |
| 2002/0021787 A1 | 2/2002 | Chea, Jr. | |
| 2002/0039416 A1 * | 4/2002 | Parrott | 379/412 |
| 2002/0155745 A1 | 10/2002 | Vo et al. | |
| 2004/0161100 A1 | 8/2004 | Menasco, Jr. | |
| 2005/0007063 A1 * | 1/2005 | Sekai | 320/101 |
| 2006/0109979 A1 * | 5/2006 | Afzal et al. | 379/399.01 |
| 2006/0233352 A1 * | 10/2006 | Ploumen | 379/399.01 |
| 2006/0239278 A1 * | 10/2006 | Hurst et al. | 370/401 |

* cited by examiner

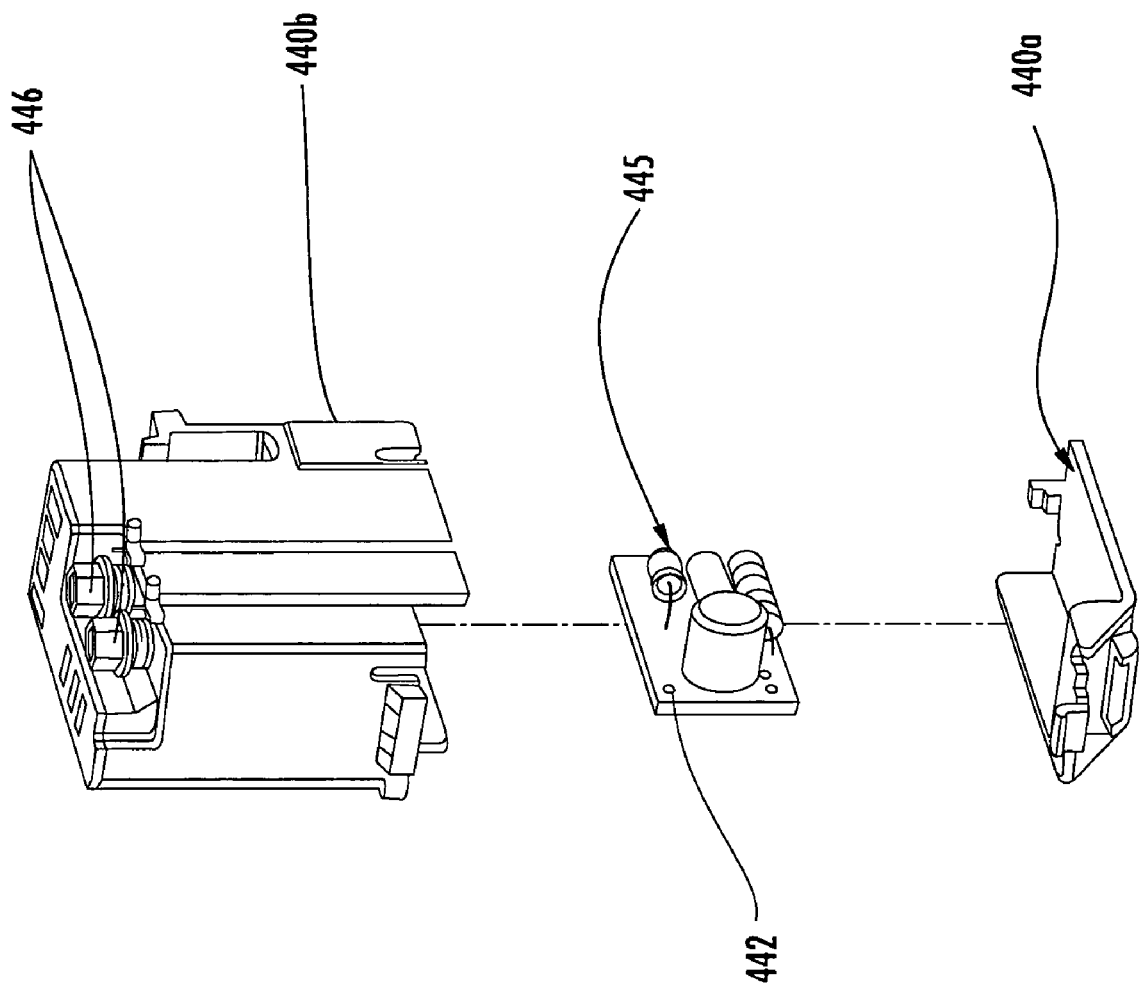

SEALING CURRENT TERMINATOR FOR INHIBITING OXIDATION AND METHODS THEREFOR

FIELD OF THE INVENTION

The present invention relates generally to methods and apparatus for inhibiting oxidation in a communications line. More particularly, the present invention concerns the provision of circuitry including a sealing current terminator at or near a subscriber's premise that assists in maintaining communication line connections by inhibiting oxidation.

BACKGROUND OF THE INVENTION

Plain old telephone systems (POTS) have been in use for some time and, because of their relatively low operating frequency, operate very compatibly with more recently introduced, concurrently provided, Asymmetric Digital Subscriber Line (ADSL) service. More recently, however, Digital Subscriber Line (DSL) service has been proposed to be provided exclusively over the communications lines previously shared with POTS service. This, so-called, "data without POTS" service continues to work well using the same communications lines previously shared with POTS service; however certain issues may arise from the provision of exclusively DSL service over previously shared communications lines that were not present when POTS service was also provided over the same communications lines.

Switched loop services such as POTS use direct current (DC) during off-hook conditions for line signaling. In addition to line signaling, a significant benefit arises from the continued presence of the direct current on the communications line, that is, the DC assists in preventing oxidation of connection or coupling points. Under normal POTS operation, approximately 20 milliamps (mA) of DC will flow through the switched loop during an off-hook condition. This direct current is used not only to signal the central office (CO) line card but also to help maintain mechanical splices (i.e. electrical connections) that are necessary and unavoidable in communication lines by inhibiting the formation of oxides or other high resistance films thereon. The current flow responsible for inhibiting oxidation is often referred to as a sealing or wetting current.

In the newly emerging environment of "data without POTS" service, absence of the previously concurrently available switched loop signaling DC creates a problem in that the mechanical splices will oxidize over a period of time and create contact problems since the low-level data signals occurring in data without POTS service do not carry enough direct current to properly inhibit oxidation. As discussed above, an example of a data without POTS application is DSL without POTS service, but may also include voice over internet protocol (VOIP) and other data transmission services that do not also include POTS service over the same communication lines or that split the POTS service from the data at an appropriate location.

While previous systems have provided partial solutions for the oxidation problem, no design has emerged to date that generally encompasses all of the desired characteristics as hereafter presented in accordance with the present invention.

SUMMARY OF THE INVENTION

In view of the recognized problems encountered from emerging data without POTS service communications addressed by the present invention, an improved methodology and apparatus for inhibiting oxidation on a communications line has been developed. Sealing current termination technology is incorporated into subscriber premise equipment in a unique manner such that oxidation problems previously avoided when switched loop signaling was present on the line may still be addressed when the POTS service is not present on the communication line that transmits data from the service provider. Additionally, the concepts of the present invention can be used when splitting the POTS signal from the data signals at or near the subscriber premises.

Various features and aspects of the present invention relate to a method for reducing oxidation in a data without POTS environment in efficient and practical ways without resorting to reinstatement of full switch loop signaling. Another advantage of certain embodiments of the present invention relates to an in-line sealing current terminator that may be easily installed by a subscriber.

Yet another advantage of certain embodiments of the present invention relates to the provision of a sealing current terminator that may be incorporated into a terminating device that interconnects subscriber and service provider wiring. As used herein, "terminating device" includes devices that connect the service provider lines with the subscriber lines and includes devices such as a network interface device (NID), line module, adjunct module, a protected terminating device (PTD), or ancillary device disposed in an auxiliary housing. By way of example, a terminating device such as a NID is provided by a DSL service provider and installed at a subscriber premises for connecting wiring. Typical NIDs correspond to housings containing a plurality of components for coupling communications lines from a central office, for example, to a subscriber's communication equipment. Certain of these components may correspond to termination devices as disclosed in U.S. patent application publication No. US 2002/0155745 A1 to Vo et al. and to customer bridge devices as disclosed in U.S. Pat. No. 6,500,020 B2 to Vo et al., both of which are commonly assigned to the assignee of the present invention and the disclosures of which are incorporated herein by reference.

One particular aspect of certain embodiments of the present invention relates to a circuit such as a printed circuit board supporting a plurality of components that collectively provide sealing current termination circuitry for a communications line and, at the same time, minimize loading effects on any data signal such as a DSL signal transmitted on the communications line.

In other exemplary embodiments of the present invention, line protective features are provided with a sealing current terminator for protecting communications equipment coupled to the communications line from high level transient voltage that may be induced thereon from environmental and other sources. Typical telecommunications protective arrangements are exemplified by U.S. Pat. No. 6,178,080 B1 to Wilken at al. entitled "Resettable Fast Current Limiter In Telecommunications Protection", but other suitable arrangements are also possible.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

BRIEF DESCRIPTION OF THE DRAWINGS

FIGS. 4, 4(a), and 4(b) are representative partial exploded illustrations of a plurality of different terminating devices having a sealing current terminator according to the present invention;

DETAILED DESCRIPTION OF THE PREFERRED EMBODIMENTS

Figure 1:
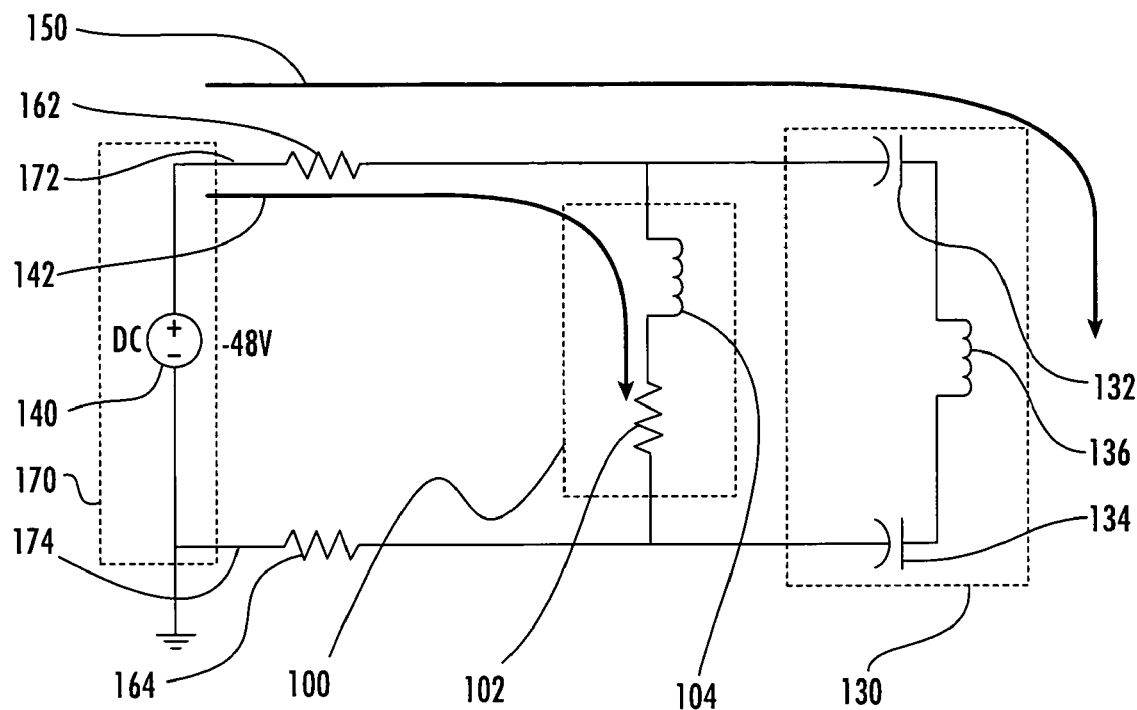
FIG. 1 is an overview schematic diagram of an exemplary DSL circuit without POTS incorporating a sealing current terminator according to the present invention.

Reference will now be made in detail to the present preferred embodiments of the invention, examples of which are illustrated in the accompanying drawings. Whenever possible, the same reference numerals will be used throughout the drawings to refer to the same or like parts. The exemplary embodiments of the invention are useful for inhibiting oxidation on communication networks or systems that transmit data without POTS service by supplying a sealing current, also known as a wetting current. With reference now to FIG. 1, there is illustrated an overview schematic diagram of an exemplary DSL without POTS circuit incorporating a sealing current terminator 100 in accordance with the present invention. High frequency DSL signaling current as represented by arrow 150 is supplied from a central office 170 to a DSL modem 130 over tip and ring communications lines 172, 174.

Modem 130 is representatively illustrated as a pair of coupling capacitor elements 132, 134 and an inductive element 136. This representation of modem 130 has been chosen to illustrate the point that modem 130 operates by exchanging high frequency currents 150 with the central office 170 over tip and ring lines 172, 174, i.e., the communications line from the service provider. In addition the selection of coupling capacitors 132, 134 as representative of the circuitry of modem 130 illustrates that modem 130 draws very little, if any, direct current (DC) from the central office. It should be understood, however, that the illustration of modem 130 is exemplary only of the general concept and not a required limitation of the present invention.

It is this lack of DC load production relative to the exemplary DSL modem 130 that contributes to the loss of oxidation-inhibiting DC current flowing in a DSL without POTS service. Likewise, other data service that is transmitted without POTS or has the POTS split therefrom may not have the direct current for inhibiting oxidation. In order to address this issue, one embodiment of the present invention provides for the addition of a sealing current terminator 100 that operates to provide a DC load and to thereby reestablish a minimal DC current flow through the communications lines 172, 174 from the central office 170 to, at least, the subscriber premises. It should be understood that such minimum current flow will be present in the communications line as a result of the implementation of sealing current terminator 100 whether or not a DSL modem, or any other communication equipment, is currently coupled to the communications line.

As shown in FIG. 1, sealing current terminator 100 may include a series connection of a direct current load element, such as a resistor 102 with an inductor 104. The value of resistor 102 is chosen with respect to the DC voltage provided by the central office by way of DC supply 140 and taking into consideration line resistance, represented by resistors 162, 164, between the central office and the subscriber premises to insure that an effective oxidation-inhibiting current level is produced within the connected communications line. As depicted in FIG. 1, sealing current terminator 100 has a first electrical connection (not numbered) on the tip-side of the communications line and a second electrical connection (not numbered) on the ring-side of communications line, thereby placing sealing current terminator 100 in parallel with, in this case, DSL modem 130.

Customarily line cards within telephone company central offices are configured to provide approximately −48 VDC for use in POTS service. With this voltage value in mind an exemplary configuration of the present invention would provide 5-20 mA of direct current on the communications line or portions thereof at all times as an effective oxidation inhibiting measure. In order to produce such a current level, an exemplary resistive value for resistor 102 might be chosen at 4700 ohms and have a suitable power dissipation capability of 2 watts. It should be appreciated that the resistive value and/or power dissipation value chosen may vary with any variation in the customarily supplied line card voltage and/or for other reasons.

In addition to resistor 102, the sealing current terminator 100 in accordance with the present invention, provides a series connected inductor 104. The inductive value of inductor 104 is chosen such that the high frequency DSL signal across lines 172, 174 will not be overly loaded by the resistor 102. The addition of inductor 104 in series with resistor 102 will allow DC to pass but will provide high impedance to DSL frequencies while the resistor 102 provides a constant DC load. In an exemplary configuration, inductor 104 may be selected to have an inductive value of approximately 10 millihenrys (mH); however, other suitable inductive values may be used based on the application.

Alternative configurations of the basic sealing current terminator 100 of the present invention are envisioned. Non-limiting examples of such alternative embodiments include the addition of a zener diode, a standard diode or a combination of a zener diode and standard diode in series with either the resistor and/or the inductor as previously illustrated. These additional components may be provided as protective and/or current limiting features, however other protective or current limiting aspects of the present invention are also envisioned as will be discussed further with respect to FIGS. 2(a) and 2(b).

Figure 2A:
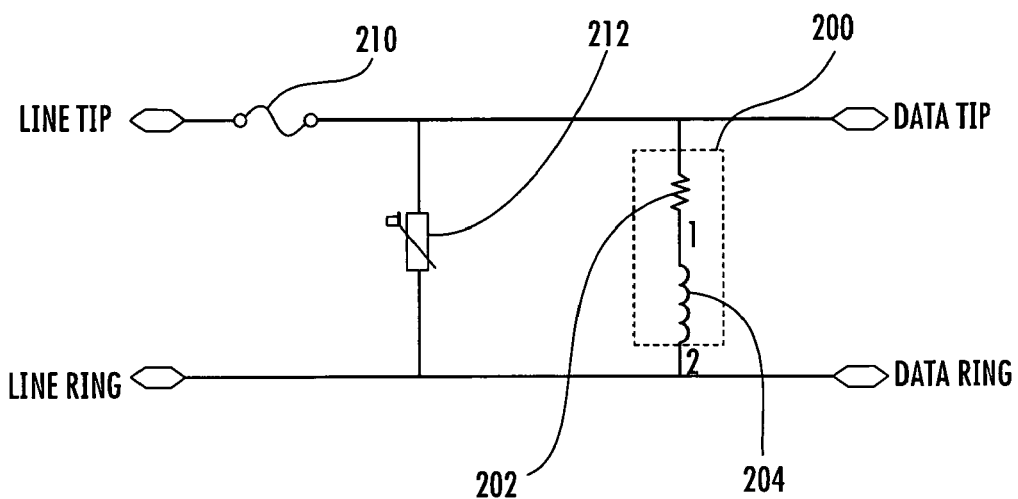
FIG. 2(a) is a schematic diagram of another embodiment of the sealing current terminator according to the present invention incorporating transient protection features.
Figure 2B:
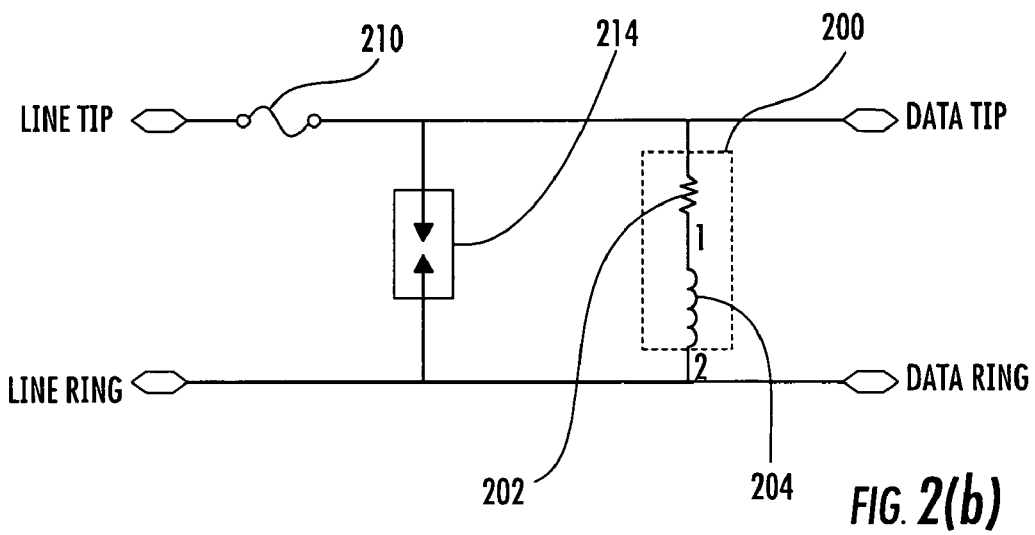
FIGS. 2(b) is a schematic diagram of still another sealing current terminator according to the present invention incorporating transient protection features.

FIGS. 2(a) and 2(b) depict other embodiments of the present invention for providing protective features in combination with the sealing current terminator. As communications lines are subject to induced transients from environmental and/or other conditions, it is an additional aspect of the present invention to provide for protection from such potentially damaging occurrences.

Transient protection for the communications lines can be provided by using any suitable configuration for the given application. FIG. 2(a) illustrates one embodiment of the present invention for providing transient protection for the equipment of the subscriber such as a modem and/or other equipment that may be coupled to the communications lines and in at least some measure to the sealing current terminator as well. As depicted, sealing current terminator 200 may include a resistor 202 coupled in series with an inductor 204 and connected across tip and ring communications lines in a manner similar to that discussed above with reference to FIG. 1.

In addition to sealing current terminator 200, transient protection features are provided in the form of a fuse 210 and a solid state protective device 212, which may be bi-directional. As illustrated in FIG. 2(a), fuse 210 is electrically coupled at one end to a line tip terminal and at the other end to one end of protective device 212. The other end of protective device 212 is coupled to a line ring terminal. The sealing current terminator 200 is then coupled in parallel with the protective device 212. As a non-limiting example, solid state protective device 212 may be a bidirectional thyristor. Other such devices or combination of devices designed to provide similar protective features may, of course, be employed. In addition, other protective features or devices may also be combined with or substituted for those here presented including, but not limited to, positive temperature coefficient (PTC) devices and fusible resistors.

FIG. 2(b) illustrates another sealing current terminator 200 combined with alternative transient protection features according to the present invention. The features illustrated in FIG. 2(b) are identical to corresponding features shown in FIG. 2(a) with the exception that the solid state protective device 212 has been replaced with an alternative transient protection component or components. Specifically, FIG. 2(b) uses a gas tube protective device 214 for providing transient protection. Gas tube 214 may correspond to a surge arrester type device or any other similar gas tube type protective device suitable for the application. Such gas tube protective device may optionally include a fail-safe mechanism for added protection. As schematically depicted, FIGS. 2(a) and 2(b) depict sealing current terminators configured as two port devices, that is, they have electrical connections for a line tip and line ring connection of the communications line of the service provider and electrical connections for the data tip and line ring connection to the subscriber equipment; however, sealing current terminators may be configured as a one port device as shown in FIG. 1.

Figure 2C:
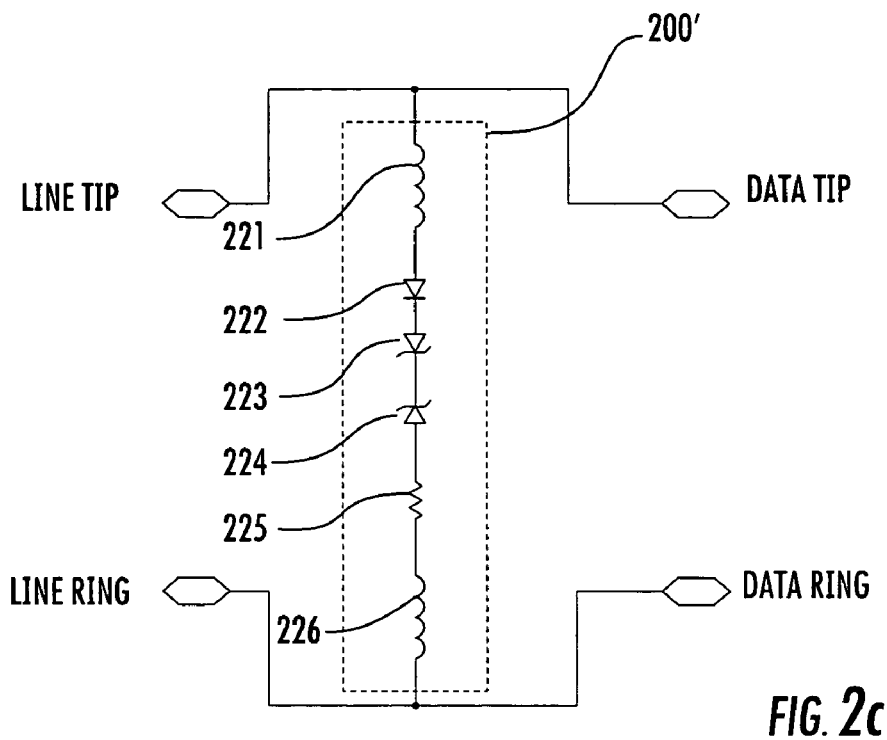
FIGS. 2(c) and 2(d) are schematic diagrams of a plurality of alternative sealing current terminators according to the present invention.
Figure 2D:
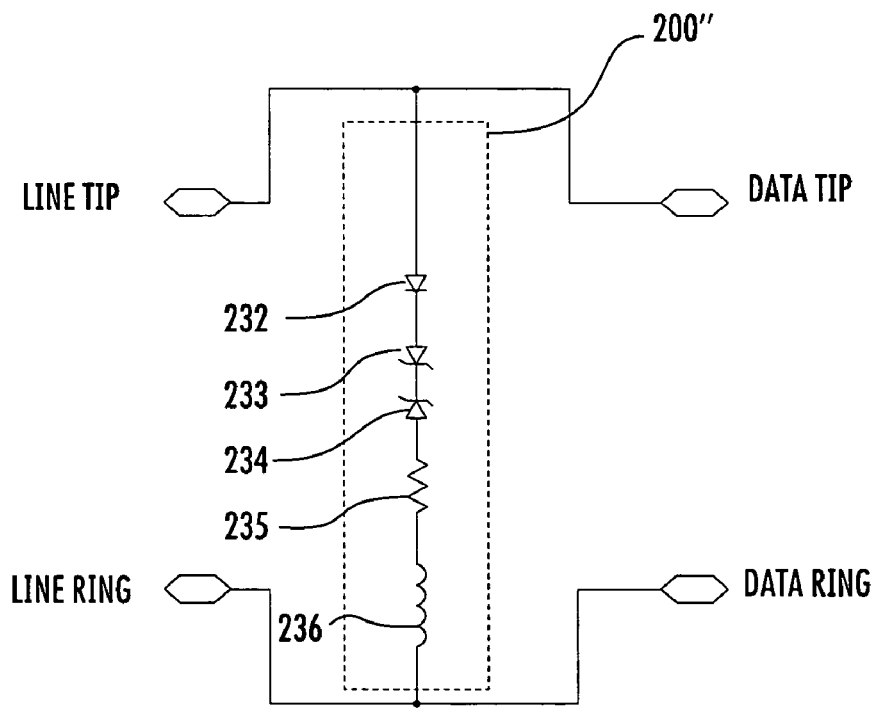

FIG. 2(c) depicts another sealing current terminator 200' without a transient protective device. Sealing current terminator 200' includes a plurality of components electrically connected in series. Specifically, sealing current terminator 200' includes a first inductor 221 connected to a diode 222 connected to a first zener diode 223 connected to a second zener diode 224 connected to a resistor 225 that is finally connected to a second inductor 226 having suitable values for the given application. Of course, other variations of the series connected components for the sealing current terminator are possible. By way of example, FIG. 2(d) depicts a sealing current terminator 200" that is similar to sealing current terminator 200', but eliminates the first inductor 221. More specifically, sealing current terminator 200" includes a diode 232 connected to a first zener diode 233 connected to a second zener diode 234 connected to a resistor 235 that is finally connected to an inductor 236. Likewise, other variations of sealing current terminators are possible, for instance, other sealing current terminators may eliminate the respective diodes 222, 232 from the series connection of components of respective sealing current terminators 200', 200". Furthermore, sealing current terminator 200' or 200" may be connected in parallel with a suitable protective device such as depicted in FIGS. 2(a) and 2(b).

Yet another aspect of the present invention is the concept of providing the subject sealing current terminator, with or without the previously discussed optional transient protection features, in a form that may readily be installed in a data without POTS service network such as a DSL without POTS service network in order to achieve the desired oxidation inhibition features. The remaining Figures illustrate non-limiting examples of apparatus and methodologies whereby such association may be achieved.

Figure 3:
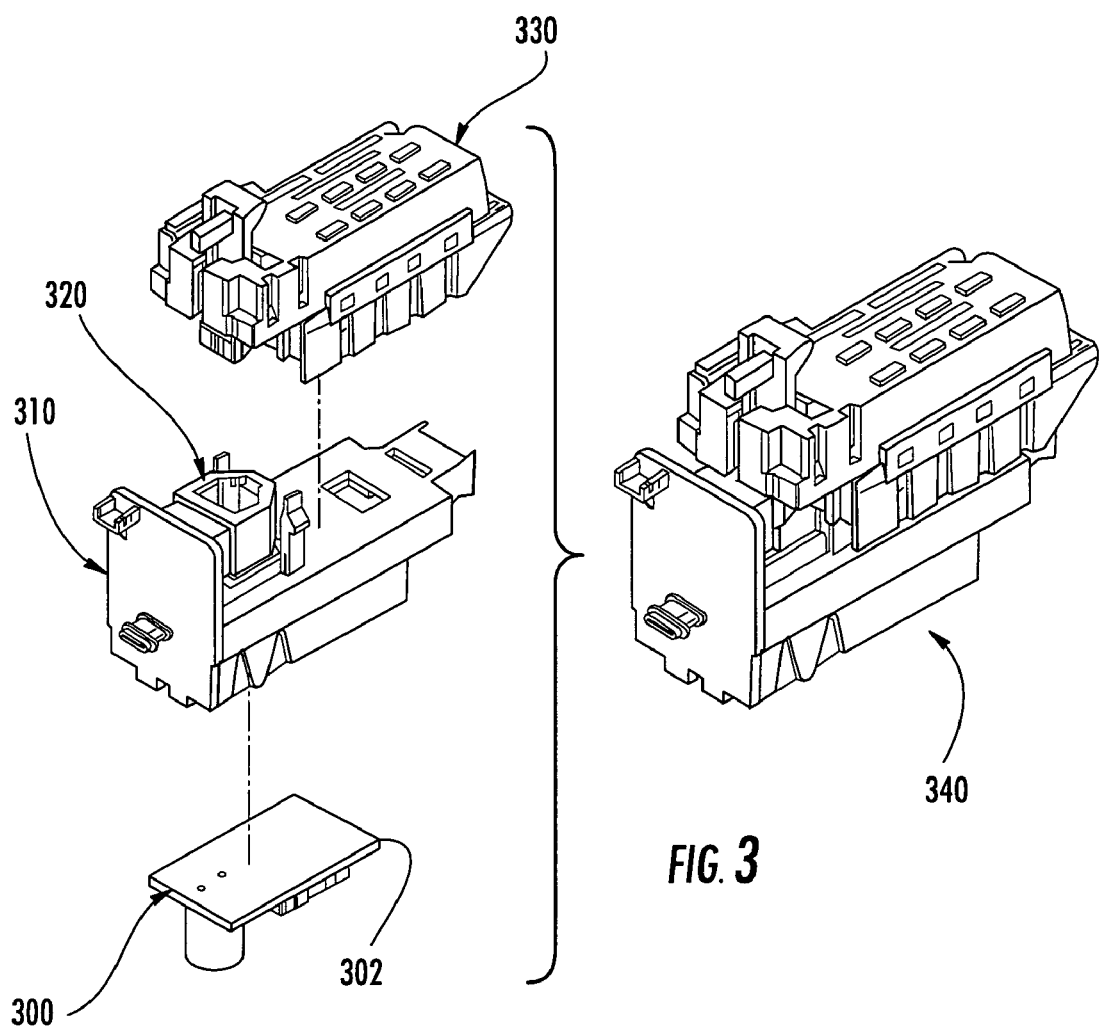
FIG. 3 represents exploded and assembled views of a single position line module for a network interface device having a sealing current terminator according to the present invention.

With reference now to FIG. 3, there are represented exploded and assembled views of a terminating device 340, specifically, a single position module for a NID including a sealing current terminator 300 in accordance with the present invention. Sealing current terminator 300 may be constructed by mounting the previously illustrated resistor and inductor components on a printed circuit board 302 together with any of the optional transient protection devices and related components as may be desirable or required in order to meet customer and/or safety requirements.

As illustrated in FIG. 3, printed circuit board 302 is shown in an inverted orientation with the sealing current terminator circuitry and optional transient protection components on the underneath side of the board for ease of association with the remaining components of the single position module illustrated. Although the circuit board is shown inverted it can have other orientations and/or configurations within the terminating device. Terminating device 340 may include a housing base 310 supporting a standard connection 320 for coupling to communication lines entering a subscriber premises. Connection 320 may correspond to a standard RJ-11 or RJ-14 connector or to any other suitable connection type as may be appropriate for the environment in which the NID is installed. Module 340 also includes a sealed subscriber bridge 330 for making electrical connections. Subscriber bridges are, of course, known to those of ordinary skill in the art and correspond to devices, for instance, of the type previously mentioned with respect to the Vo et al. '020 Patent and Vo et al. '745 Patent Application Publication. Additionally, subscriber bridge 330 has multiple electrical connections (not numbered), in this case connections for four subscriber lines on the subscriber bridge, so that several subscriber lines (i.e., respective data ring and data tip lines) may be connected to the incoming communications line (i.e., line tip and line ring).

Figure 4:
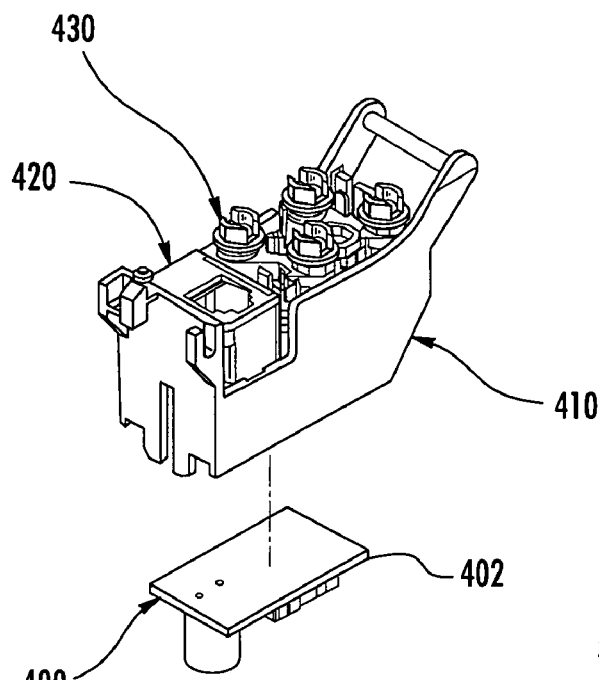

With reference now to FIG. 4 there is illustrated a partial exploded view of another terminating device, specifically, a subscriber line module (not numbered) with which the sealing current terminator circuitry according to the present invention may be combined. As with the embodiment illustrated in FIG. 3, printed circuit board 402 is shown in an inverted orientation with the sealing current terminator circuitry and optional transient protection components on the underneath side of the board for ease of assembly with the remaining components of the line module illustrated.

Figure 4B:
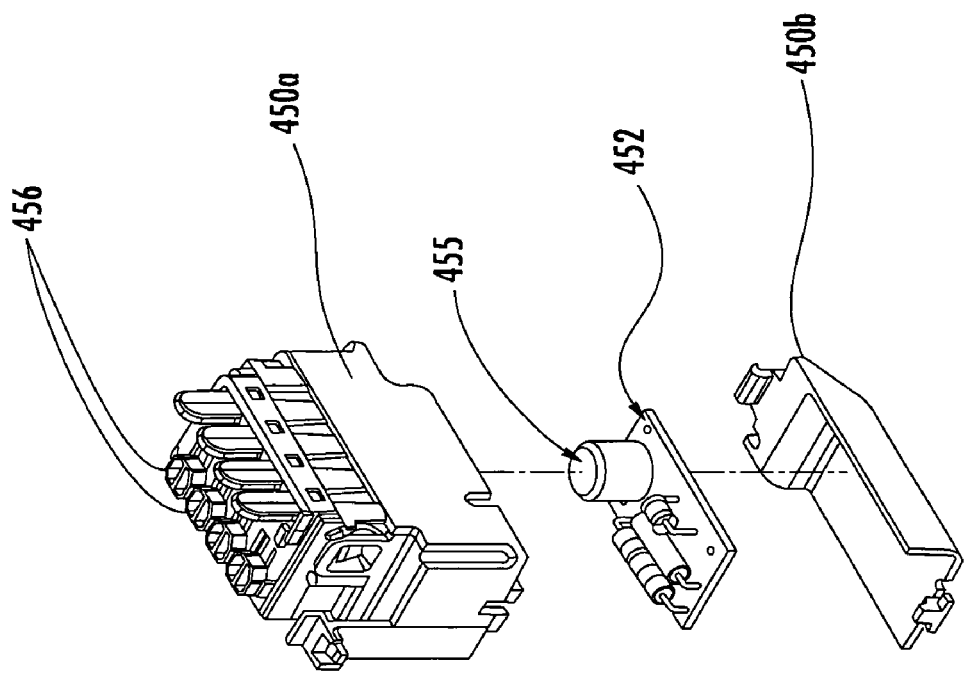

The subscriber line module of FIG. 4 includes a housing base 410 supporting a connection 420 that, like connection 320 of FIG. 3 may correspond to a standard RJ-11 or RJ-14 connector or to any other suitable connector type as may be appropriate for the environment in which the NID is installed. Unsealed screw terminals 430 provide communications line connecting points as well understood by those of ordinary skill in the art. Of course, other embodiments utilizing the concepts of the present invention are possible. By way of example, subscriber line modules may add and/or eliminate structure. For instance, FIGS. 4(a) and 4(b) respectively depict subscriber line modules that eliminate the standard RJ-11 or RJ-14 connection 420 as shown in FIG. 4. FIG. 4a depicts a subscriber line module having a two-piece housing 440a, 440b with a circuit board 442 having a sealing current terminator circuitry 445 as disclosed herein. In this embodiment, the subscriber line module includes electrical connections that are configured as screw terminals 446. FIG. 4b illustrates another subscriber line module having a two-piece housing 450a,450b with a circuit board 452 having a sealing current terminator circuitry 455 where the electrical connections are configured as insulation displacement contacts (IDCs) 456. Likewise, other suitable configurations of terminating devices are possible using the concepts of the present invention.

Figure 5:
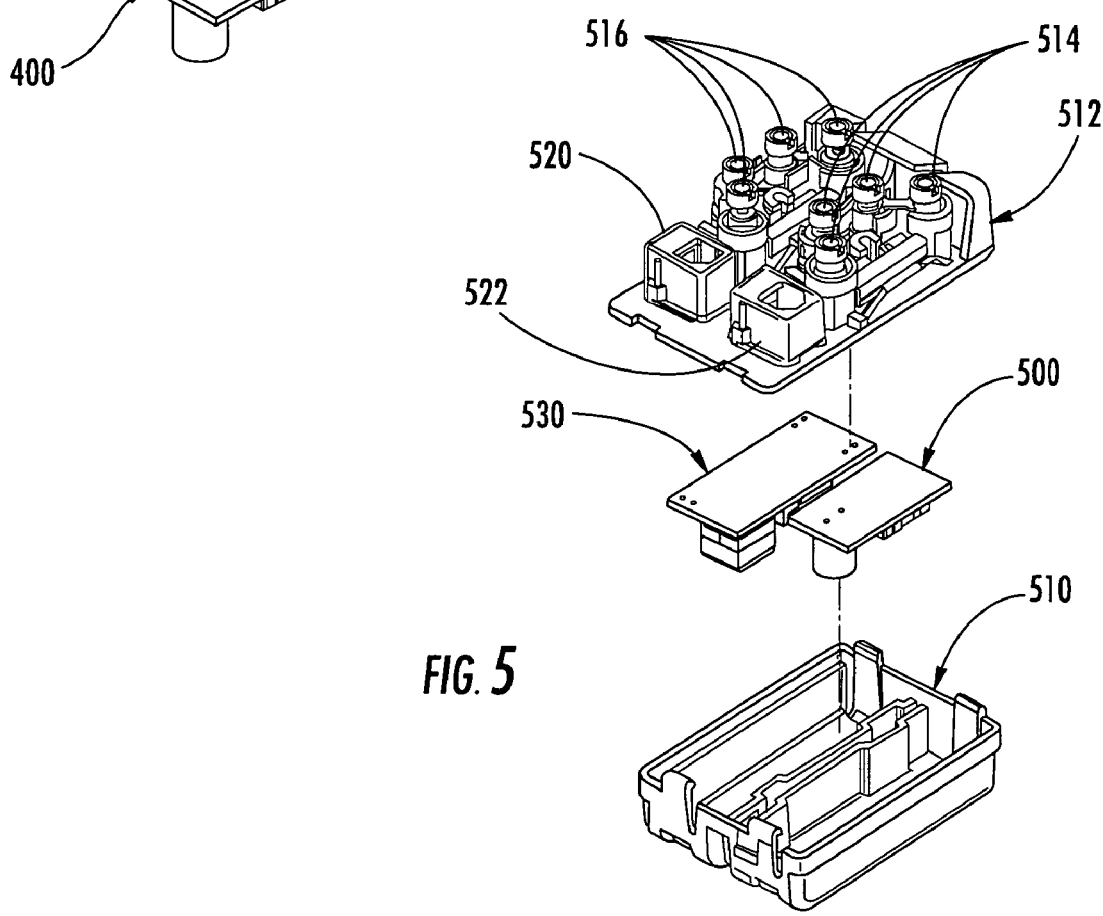
FIG. 5 is a partial exploded view of a dual-position terminating device having a sealing current terminator according to the present invention.

With reference now to FIG. 5 there is illustrated yet another embodiment of the present technology corresponding to a dual-position termination device (not numbered) that representatively illustrates a number of possible configurations as will be discussed later. The dual-position termination device is configured for interconnecting two incoming communications lines from the service provider with two or more subscriber lines. FIG. 5 depicts a partial exploded view showing a housing base 510 configured to house a DSL/POTS line splitter circuit 530 and a sealing current terminator 500 as separate circuit boards, but circuits 530 and 500 may be disposed on a single circuit board. By way of example, the dual-position termination device of FIG. 5 is configured for a first incoming service provider communications line having DSL with POTS and a second incoming service provider communications line provides only DSL. In other words, sealing current terminator 500 is only necessary on the second position of the terminating device that has the DSL service. As with previously illustrated embodiments, the DSL/POTS line splitter circuit 530 and sealing current terminator 500 are illustrated as corresponding to inverted circuit boards with circuitry components mounted on the underneath side for ease of association with the remaining components of the terminating device such as the NID with which they are associated. As representatively illustrated, the embodiment of FIG. 5 uses a dual configuration subscriber bridge 512 that is unsealed, but other suitable bridge configurations are possible. When connected, DSL/POTS line splitter circuit 530 separates the first incoming combined signal from the first communications line of the service provider into the POTS signal and a DSL signal. Consequently, sealing current terminator 500 is used on the second postion of the dual-position terminating device to provide a sealing current and inhibit oxidation on the DSL side of the dual-position terminating device.

As shown, subscriber bridge 512 is electrically connected with the two circuit boards on which are mounted a pair of separate connection/screw terminal connection combinations. The first of these connection combinations, i.e., a first tip and data connection, may be associated with a voice connection (i.e. POTS) and corresponds to unsealed screw terminals 516 and connector 520. A second of these connector combinations, i.e. a second tip and ring connection, may be associated with a DSL connection and corresponds to unsealed screw terminals 514 and connector 522.

As mentioned earlier, the embodiment of the present invention illustrated in FIG. 5 is intended to illustrate a number of different combinations, all envisioned as being a part of the presently disclosed invention. Exemplary combinations all resulting in dual-position termination device configurations may include but are not limited to: a dual-position line module and sealing current terminator (SCT) with unsealed terminals as generally illustrated in FIG. 5 but also might include sealed terminals; a dual-position line module/SCT configuration with or without demarcation; a dual-position SCT/SCT configuration with sealed or unsealed termination and with or without demarcation; and an ancillary housing mounted beside a NID as a single or dual configuration with sealed or unsealed terminals and with or without demarcation. The term "demarcation," as will be understood by those of ordinary skill in the relevant art, refers to the point or interconnection between the service provider's communications cabling, terminal equipment, and protective apparatus and the subscriber's telecommunications cabling system generally located at the premise.

Other variations of the dual-position terminating device having a sealing current terminator are within the scope of the present invention. By way of example, a dual-position terminating device can be used in a bonded pair termination device application where data is transmitted to the subscriber on two incoming lines and then the data on the two lines is merged at the modem or other suitable location. In this bonded pair scenario, neither incoming data line has POTS so the terminating device of the invention provides a sealing current terminator 500 for each line instead of just the DSL portion of the DSL/POTS line module and sealing current terminator combination as depicted in FIG. 5. In other words, the dual-position bonded pair terminating device is similar to FIG. 5, except it replaces the DSL/POTS line splitter circuit 530 with a second sealing current terminator 500 so that each communication line has a sealing current for inhibiting oxidation thereon. Of course, other suitable configurations are possible with the concepts of the present invention such as multiple position terminating devices.

Figure 6:
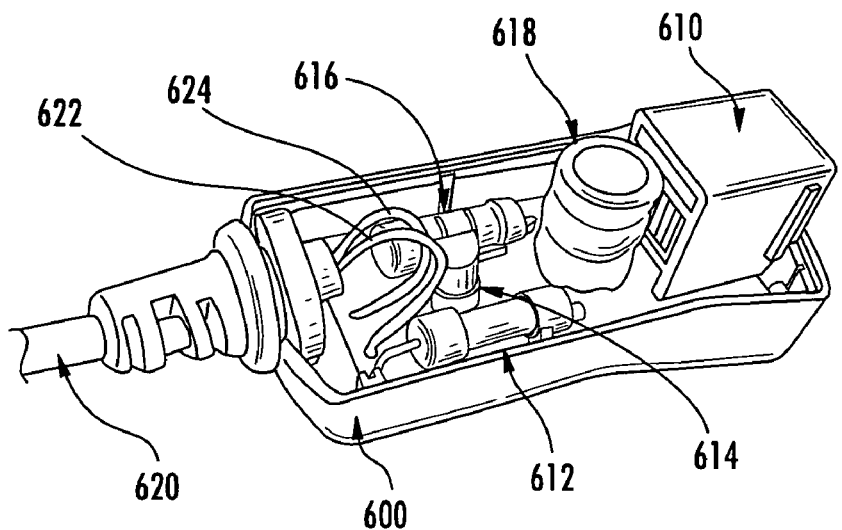
FIG. 6 is an partial illustration of an in-line filter having a sealing current terminator according to the present invention with a portion of a housing removed.
Figure 7A:
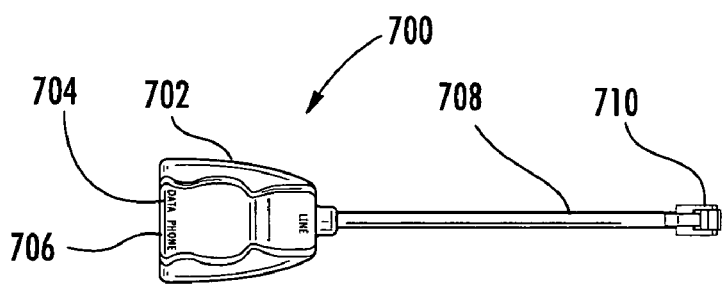
FIGS. 7(a)-(c) represent various alternative configurations for in-line filters suitable for incorporating a sealing current terminator according to the present invention.
Figure 7B:
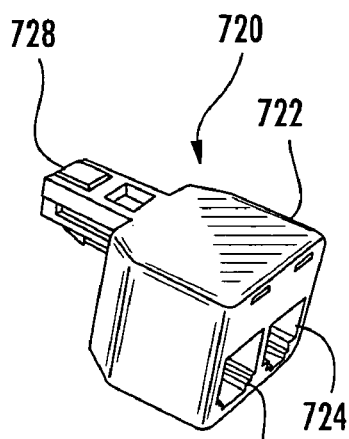
Figure 7C:
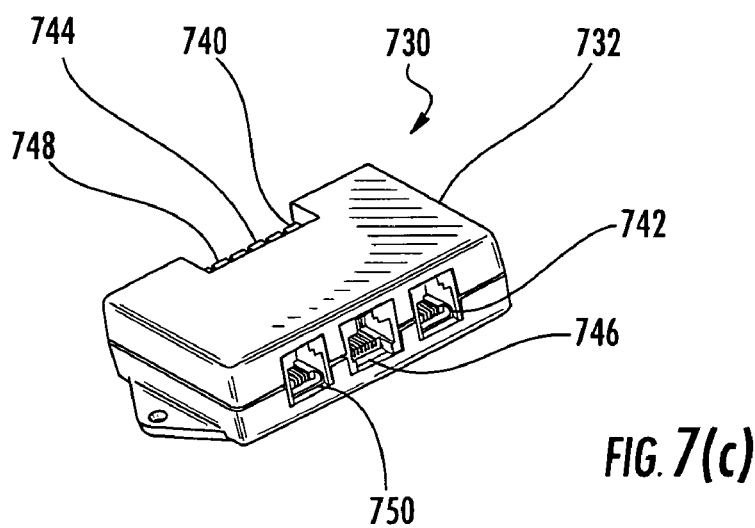

FIGS. 6-7(c) depict a group of exemplary embodiments of the present invention configured to allow subscribers to easily self-install a sealing current terminator (SCT) device to provide the benefits of oxidation inhibition as herein described. FIGS. 6-7(c) illustrate several exemplary embodiments that incorporate the concepts of the present invention as in-line devices in various configurations.

FIG. 6 illustrates a portion of housing, with the top half of the housing removed, of a type often used to house an in-line filter circuit of the variety often sent to new residential DSL customers as a part of a self installation kit. Such filters are designed to be coupled in-line with a homeowner's existing POTS equipment as a means for reducing loading of the DSL signal coupled to their existing POTS communication line. Specifically, the device of FIG. 6 is a single-jack in-line filter. According to the present invention, housings, similar to in-line filter housings, may be employed as housings for sealing current terminators (SCT) to allow easy installation by a subscriber so that self-installed sealing current termination and consequent provision of oxidation inhibiting capability may be easily achieved by untrained personnel.

With further reference to FIG. 6, a lower portion of a housing 600 for carrying a circuit board (not numbered) is illustrated. It is understood that the present invention envisions providing an upper housing portion also but that such has been omitted for purposes of clarity. The printed circuit board has mounted thereon a connection 610 such as a standard RJ-11 or RJ-14 jack, a fuse 612, an overvoltage protective device 614, a resistor 616 and an inductor 618 all electrically coupled together in a circuit configuration as previously illustrated in FIG. 2(a) and 2(b).

Line cord 620, which may have attached thereto a connection compatible with the connection type employed as connection 610 attached to the left end not shown in FIG. 6, and corresponding electrical conductors such as electrical wires 622, 624 are provided for coupling the board circuit wiring and components through the line cord 620 to, for example, a wall jack as may be provided in or near a subscriber premises. By way of example, connection 610 may correspond to a standard RJ-11 jack or, alternatively, any other suitable connection.

With reference now to FIGS. 7(*a*)-(*c*) there are illustrated non-limiting examples of other terminating devices/housing types that may be employed to house sealing current terminators (SCT) in accordance with the present invention. Each of the illustrated housings may be used as a user installable device for providing oxidation inhibiting capabilities for data without POTS service.

As illustrated in FIG. 7(*a*) a device 700 similar in form to that illustrated in FIG. 6 has been provided except that device 700 has been configured as a dual-jack in-line device that allows for splitting the incoming signal into separate data and POTS service. In other words, the sealing current termination only is required on the data service in a manner as discussed with the network interface device (NID) illustrated in FIG. 5. Device 700 includes a housing portion 702 enclosing a data connection 704 and a phone connection 706 for routing the separated services to the appropriate equipment of the subscriber. Splitting and sealing circuitry contained within housing portion 702 are electrically coupled via a connecting cable 708 to a connection 710 in a configuration allowing in-line connection by untrained personnel.

FIG. 7(*b*) illustrates a device 720 having an alternative configuration that is housed in a housing type commonly used as, for example, a telephone line module. Simply stated, device 720 is similar to device 700, but it eliminates cord 708. Device 720 includes a housing 722 enclosing a data connection 724 and a phone connection 726 as well as splitting and sealing current termination circuitry (not visible). Device 720 also includes a connection 728 designed for direct insertion into a residential type wall connection. As with device 700 illustrated in FIG. 7(*a*), device 720 of FIG. 7(*b*) is configured to allow easy in-line connection with existing residential equipment by untrained personnel so that the oxidation inhibiting benefits of the present invention may easily be provided.

Finally, referring to FIG. 7(*c*), yet another device 730 for in-line use having an alternative splitter housing configuration is illustrated with its associated connection terminals. The enclosed circuitry of device 730 provides similar capabilities to those previously discussed with respect to FIG. 7(*a*) and 7(*b*) for splitting and sealing current termination circuitry. More particularly, device 730 illustrated in FIG. 7(*c*) includes a housing 732 enclosing dual sets of connections. A first set of connections 740, 744, 748 may be compression, insulation displacement connectors (IDC), or screw type connectors as may be used to couple bare conductors, i.e., wires, to the circuitry contained within device 730, but other types of connectors are possible. A second set of connections 742, 746, 750 corresponds to connector jacks as, for example, the previously noted RJ-11 jack connectors employed in previously mentioned embodiments. Of course, any suitable type of connections may be employed with any of the embodiments discussed herein.

In an exemplary configuration illustrated, the connection sets of device 730 may be paired such that connections 740 and 742 may be coupled to an incoming line connection, connections 744 and 746 may be coupled to a DSL modem, and connections 744, 750 may be coupled to POTS equipment. Such multiple coupling capabilities will provide users with maximum coupling variations with sealing current termination functions where desired while allowing subscribers or the craft to install the device.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A sealing current terminator, comprising:
   a housing;
   a direct current load element disposed within the housing, the direct current load element configured for being electrically coupled to a communications line of a service provider for drawing a direct current along a connected communications line that would otherwise not have a suitable direct current for inhibiting oxidation;
   a first electrical connection of the sealing current terminator configured for being electrically coupled with a tip-side of the communications line; and
   a second electrical connection of the sealing current terminator configured for being electrically coupled with a ring-side of the communications line, wherein
   the housing is a portion of one of a group selected from an in-line filter housing, a single-jack in-line housing, a dual jack in-line housing, a network interface device housing, a line module housing, a splitter housing, and a adjunct module housing.

2. The sealing current terminator of claim 1, further comprising an inductor coupled in series with the direct current load element that is a resistor, wherein the inductor and the resistor are mounted on a circuit board and disposed within the housing.

3. The sealing current terminator of claim 1, the line module comprising:
   a splitting circuit for separating an incoming a data signal and a plain old telephone system (POTS) signal from the communications line of the service provider into the POTS signal and the data signal, the POTS signal being routed to a first tip and ring connection and the data signal being routed to a second tip and ring connection, wherein at least the second communications signal does not include a plain old telephone signal (POTS) and the sealing current terminator is connected between the second tip and ring connection.

4. The sealing current terminator of claim 3, wherein the splitting circuit is configured for separating a plain old telephone signal (POTS) from a digital subscriber line (DSL) signal.

5. The sealing current terminator of claim 1, further comprising an inductor coupled in series with the direct current load element.

6. The sealing current terminator of claim 1, further comprising a transient protection device.

7. The sealing current terminator of claim 6, further comprising a fuse in series relationship with the transient protection device.

8. The sealing current terminator of claim 1, the line module housing having a plurality of data tip and data ring connections configured for connection of a plurality of subscriber lines to the line module.

9. A sealing current terminator, comprising:
   a housing;

a direct current load element disposed within the housing, the direct current load element configured for being electrically coupled to a communications line of a service provider for drawing a direct current along a connected communications line that would otherwise not have a suitable direct current for inhibiting oxidation;

a first electrical connection of the sealing current terminator configured for being electrically coupled with a tip-side of the communications line;

a second electrical connection of the sealing current terminator configured for being electrically coupled with a ring-side of the communications line; and a transient protection device selected from a group consisting of a solid state protection device, a bidirectional solid state protection device, and a gas tube protection device.

10. A sealing current terminator, comprising:

a housing;

a direct current load element disposed within the housing, the direct current load element configured for being electrically coupled to a communications line of a service provider for drawing a direct current along a connected communications line that would otherwise not have a suitable direct current for inhibiting oxidation;

a first electrical connection of the sealing current terminator configured for being electrically coupled with a tip-side of the communications line;

a second electrical connection of the sealing current terminator configured for being electrically coupled with a ring-side of the communications line; and a gas tube protection device having a fail-safe device.

11. A method for providing sealing current in a data without plain old telephone service (POTS) line, comprising the steps of:

providing a communications line extending between a service provider and a subscriber premises;

coupling a direct current supply to the communications line;

providing a sealing current terminator for drawing a sealing current from the direct current supply;

coupling the sealing current terminator device to the communications line, whereby the sealing current is transmitted along the communications line for inhibiting oxidation; and coupling a transient protection device in parallel with the sealing current terminator, wherein the step of coupling a transient protection device to the communications line comprises coupling an element selected from a group consisting of a solid state protection device, a gas tube protection device, a fail-safe gas tube protection device.

12. The method of claim 11, wherein the step of providing a sealing current terminator comprises providing a direct current load element disposed within a terminating device.

13. The method of claim 11, wherein the step of providing a sealing current terminator comprises providing a direct current load element disposed within a housing, the housing including connections configured for electrically coupling the direct current load element between the communications line and communications equipment at a subscriber premise.

14. The method of claim 11, further comprising the step of:

providing a sealing current terminator with an inductive device that is in series with a direct current load element device, wherein the direct current load element is a resistor.

15. A terminating device for use on a communications line, comprising:

a housing;

a line ring and a line tip connection configured for electrically coupling to the communications line;

a data ring and a data tip connection configured for electrically coupling to communications equipment of the subscriber;

a direct current load element supported in the housing, the direct current load element is electrically coupled between the line ring and line tip connection for drawing a sealing current along a portion of the communication network thereby inhibiting oxidation from occurring; and a transient protection device selected from a group consisting of a solid state protection device a bidirectional solid state protection device, and a gas tube protection device.

16. The terminating device of claim 15 further comprising:

a splitting circuit for separating an incoming a data signal and a plain old telephone system (POTS) signal from the communications line of the service provider into the POTS signal and the data signal, the POTS signal being routed to a first tip and ring connection and the data signal being routed to a second tip and ring connection, wherein at least the second communications signal does not include a plain old telephone signal (POTS) and the sealing current terminator is connected between the second tip and ring connection.

17. The terminating device of claim 16, wherein the splitting circuit is configured for separating a plain old telephone signal (POTS) from a digital subscriber line (DSL) signal.

18. The terminating device of claim 15, further comprising an inductor coupled in series with the direct current load element between the line tip and line ring connection, wherein the direct current load element is a resistor.

19. The terminating device of claim 15, further comprising a fuse in series relationship with the transient protection device.

20. The terminating device of claim 15, wherein the housing is a portion of a line module housing, the line module housing having a plurality of data tip and data ring connections configured for connection of a plurality of subscriber lines to the line module.

21. The terminating device of claim 15, wherein the housing is a portion of a dual-position termination device.

22. A sealing current terminator for data without plain old telephone service (POTS) communications line, comprising:

a housing;

a line ring and a line tip connection configured for being electrically coupled to the data without POTS communications line;

a data ring and a data tip connection supported at least partially within the housing, the data ring and the data tip connection configured for being electrically coupled to communication equipment of the subscriber; and a direct current load element disposed within the housing and electrically coupled between the line ring and the line tip connection for drawing a sealing current in the data without POTS communications line thereby inhibiting oxidation from occurring in portions the communications line; wherein the housing is a portion of one of a group selected from an in-line filter housing, a single-jack in-line housing, a dual-jack in-line housing, a network interface device housing, a line module housing, a splitter housing, and a adjunct module housing.

23. The sealing current terminator of claim 22, wherein the direct current load element comprises a resistor and further comprising:

an inductor coupled in series with the resistor between the line ring and line tip connection.

24. A sealing current terminator for data without plain old telephone service (POTS) communications line, comprising:

a housing;

a line ring and a line tip connection configured for being electrically coupled to the data without POTS communications line;

a data ring and a data tip connection supported at least partially within the housing, the data ring and the data tip connection configured for being electrically coupled to communication equipment of the subscriber;

a direct current load element disposed within the housing and electrically coupled between the line ring and the line tip connection for drawing a sealing current in the data without POTS communications line thereby inhibiting oxidation from occurring in portions the communications line; and a transient protection device coupled in parallel with the sealing current terminator.

25. The sealing current terminator of claim 24, further comprising:

a fuse coupled in series relationship with the transient protection device.

\* \* \* \* \*